(12) United States Patent
Sinha et al.

(10) Patent No.: US 7,187,569 B2
(45) Date of Patent: Mar. 6, 2007

(54) SIGNAL GENERATION APPARATUS AND METHOD FOR SEAFLOOR ELECTROMAGNETIC EXPLORATION

(75) Inventors: Martin C. Sinha, Southampton (GB); Lucy M. MacGregor, Southampton (GB)

(73) Assignee: University of Southampton, Southampton (GB)

( * ) Notice: Subject to any disclaimer, the term of this patent is extended or adjusted under 35 U.S.C. 154(b) by 0 days.

(21) Appl. No.: 10/492,314

(22) PCT Filed: Oct. 2, 2002

(86) PCT No.: PCT/GB02/04460

§ 371 (c)(1),
(2), (4) Date: Apr. 12, 2004

(87) PCT Pub. No.: WO03/034096

PCT Pub. Date: Apr. 24, 2003

(65) Prior Publication Data

US 2004/0239297 A1    Dec. 2, 2004

(30) Foreign Application Priority Data

Oct. 15, 2001    (GB) ................................ 0124690.9

(51) Int. Cl.
*H02M 7/505* (2006.01)
(52) U.S. Cl. .................... 363/160; 363/85; 363/128
(58) Field of Classification Search .................. 363/85, 363/128, 160, 157, 159, 164, 165
See application file for complete search history.

(56) References Cited

U.S. PATENT DOCUMENTS 2,342,676 A    2/1944   Bradley
3,320,515 A    5/1967   Lawrence et al.

(Continued)

FOREIGN PATENT DOCUMENTS

JP    01206873    8/1989

(Continued)

OTHER PUBLICATIONS

Sinha, M.C. et al. "An active source electromagnetic sounding system for marine use." Marine Geophysical Researches. 12 (1990): 59-68.

(Continued)

*Primary Examiner*—Gary L Laxton
(74) *Attorney, Agent, or Firm*—Renner, Otto, Boisselle & Sklar, LLP

(57) ABSTRACT

An apparatus for generating electronic signals for application in subsea electromagnetic exploration. A surface generated high-voltage low-current source signal stabilized at a first frequency is supplied to a deep-tow vehicle (18) via an umbilical cable (16). The high-voltage low-current signal is transformed at the deep-tow vehicle to a high-current low-voltage a.c. signal by a transformer (52) within a cycloconverter (30). A semiconductor relay bridge (104) provides switchable rectification of the high-current low-voltage a.c. signal to provide a quasi-square wave at a second frequency, lower than the first frequency, for supply to a transmitting antenna (22) towed by the deep-tow vehicle. The times of the rectification switching are dependent on zero crossings of the high-current low-voltage a.c. signal. Allowable rectification switching times may be gated to occur only within pre-determined time windows to avoid noise-induced zero-crossing switching. The apparatus allows multiple transmission frequencies to be derived from a single stabilized source and improves spectral integrity by avoiding rectification switching at zero-crossings not occurring at the first frequency.

5 Claims, 5 Drawing Sheets

U.S. PATENT DOCUMENTS

| | | | |
|---|---|---|---|
| 3,679,978 A | | 7/1972 | Hopkins |
| 3,718,854 A | * | 2/1973 | Spyrou et al. .............. 363/159 |
| 3,852,654 A | | 12/1974 | Gyugyi et al. |
| 4,145,592 A | | 3/1979 | Mizukawa et al. |
| 4,164,016 A | * | 8/1979 | Schuchard ................... 363/88 |
| 4,730,245 A | * | 3/1988 | Sato ............................. 363/54 |
| 4,980,649 A | * | 12/1990 | Gulczynski .................. 330/10 |
| 6,057,674 A | * | 5/2000 | Bangerter ................... 323/211 |
| 6,177,651 B1 | * | 1/2001 | Reynolds et al. ...... 219/137 PS |
| 6,288,919 B1 | * | 9/2001 | Jain ............................. 363/89 |

FOREIGN PATENT DOCUMENTS

| | | |
|---|---|---|
| WO | 00/70733 | 11/2000 |

OTHER PUBLICATIONS

Constable, S. et al. "Marine controlled-source electromagnetic sounding II: The PEGASUS experiment." Journal of Geophysical Research. 101.B3 (1996): 5519-5530.

Cox, C.S. et al. "An active source EM method for the seafloor." 1983.

Deaton, T. Scripps 1983. Private communication to M. Sinha ca. 1984-6.

Chave, Alan D. et al. "Chapter 12, Electrical Exploration Methods for the Seafloor." Electromagnetic Methods in Applied Geophysics. 1992.

* cited by examiner

SIGNAL GENERATION APPARATUS AND METHOD FOR SEAFLOOR ELECTROMAGNETIC EXPLORATION

This application is a national phase of International Application No. PCT/GB02/04460 filed Oct. 2, 2002 and published in the English language.

BACKGROUND OF THE INVENTION

The invention relates to an apparatus and method for generating electronic signals for use in the field of seafloor electromagnetic exploration.

Determining the response of the sub-surface strata within the earth's crust to electromagnetic fields is a valuable tool in the field of geophysical research. The geological processes occurring in thermally, hydrothermally or magmatically active regions can be studied, for example. In addition, electromagnetic sounding techniques can provide valuable insights in to the nature, and particularly the likely hydrocarbon content, of subterranean reservoirs in the context of subterranean oil exploration and surveying.

Seismic techniques are often used during oil-exploration expeditions to identify the existence, location and extent of reservoirs in subterranean rock strata. Whilst seismic surveying is able to identify such voids the technique is often unable to distinguish between the different possible contents within them, especially for void contents which have similar mechanical properties. In the field of oil exploration, it is necessary to determine whether a previously identified reservoir contains oil or just seawater. To do this, an exploratory well is drilled to sample the contents of the reservoir. However, this is an expensive process, and one which provides no guarantee of reward.

Whilst oil-filled and water-filled reservoirs are mechanically similar, they do possess significantly different electrical properties and these provide for the possibility of electromagnetic based discrimination testing. A known technique for electromagnetic probing of subterranean rock strata is the passive magneto-telluric (MT) method. The signal measured by a surface-based electromagnetic detector in response to EM fields generated naturally, such as within the earth's atmosphere, can provide details about the surrounding subterranean rock strata. In practice a series of detectors are used to isolate effects which are local to each detector. However, for deep-sea surveys, all but those MT signals with periods corresponding to several cycles per hour are screened from the seafloor by the highly conductive seawater. Whilst the long wavelength signals which do penetrate to the sea-floor can be used for large scale undersea probing, they do not provide sufficient spatial resolution to examine the electrical properties of the typically relatively small scale subterranean reservoirs.

To overcome the lack of suitable MT signals at the seafloor, active EM sounding can be employed. Information about the subterranean strata is determined by examining the response of remote detectors to an artificial EM source, where both the detectors and source are located at, or near, the seafloor. Benefits of this method include the ability to know a priori the input signal to which the subterranean rock strata are exposed, the ability to select particular frequencies and coherence lengths of EM signal and the ability to set the relative geometry of transmitter and receiver antennae.

FIG. 1 of the accompanying drawing shows schematically how a surface vessel 14 undertakes EM sounding of the subterranean rock strata 8 in which a reservoir 12 has already been identified. The surface vessel 14 floats on the surface 2 of the sea 4. A deep-sea vessel 18 is attached to the surface vessel 14 by an umbilical connector 16 which provides an electrical, optical and mechanical connection between the deep-sea vessel 18 and the surface vessel 14. The deep-sea vessel 18 is towed by the surface vessel 14 such that it remains consistently close to the seafloor 6. This is facilitated by an echo-location package 20 which relays information about the height of the deep-sea vessel 18 above the seafloor 6 to the surface vessel 14. The deep-sea vessel 18 receives electrical power from the ship's on-board power supply via the umbilical 16. A cycloconverter unit 30 generates the chosen waveform to be supplied to a transmitting antenna 22. The antenna 22 is towed by the deep-sea vessel 18. The antenna 22 broadcasts the EM signal into the sea 4, and this results in a component passing through the rock strata 8. A remote instrument package 26 records the signal received by an antenna 24 in response to the transmitted EM signal. If the separation of the transmitting antenna 22 and the receiving antenna 24 is greater than a few hundred meters, the highly conductive seawater strongly attenuates the direct signal between them. The components of the EM signal that have travelled through the rock strata 8 and the reservoir 12 dominate the received signal and provide information about the electrical properties of these regions. At the end of the sounding experiment, a remotely deployable flotation device 28 carries the instrument package to the surface 2 for recovery and retrieval of data for inversion analysis.

FIG. 2 of the accompanying drawings schematically shows the deep-sea vessel 18 and transmitting antenna 22 in more detail. The umbilical 16 is attached to the deep-sea vessel 18 via a swivelable connection 32. The echo-location package 20 and cycloconverter unit 30 are carried within the deep-sea vessel 18. A fin 34 helps to stabilise the deep-sea vessel 18 as it is drawn through the seawater 4. The antenna 22 is attached to the deep-sea vessel 18 by a towing bar 36. The antenna 22 comprises a fore electrode 38 and an aft electrode 42. The EM signal generated by the cycloconverter unit 30 is applied to the electrodes 38, 42 via signal cables 40, 44. It is the conducting seawater 4 which provides the unscreened return path for the electrical current and generates a dipolar EM field. The electrodes 38, 42 and cables 40, 44 are supported by a neutrally buoyant hose 46. A tail rope 48 supplies a drag force to the trailing end of the antenna 22 to assist in keeping it correctly extended.

The exact choice of the waveform supplied to the transmitting antenna 22 and the ability to vary its fundamental properties, such as frequency, is important. Different frequencies of EM signal will propagate differently through the rock strata 8. Each frequency therefore provides information which is sensitive to the particular conditions along different paths within the rock strata 8, and together allow for more detailed mapping. The stability of the waveform in amplitude, frequency and phase are crucial to providing the best possible examination of the rock strata 8. For example, with no direct connection between the transmitting 22 and receiving 24 antennae, it is impossible to transmit information about phase drifts in the source EM signal to the instrument package 26. Accordingly, it is impossible to distinguish between a drift in the phase of the source signal and a change in the propagation time between source and receiver. The precision to which the electrical properties of the rock strata, which determine the signal time delay, can be determined is therefore highly dependent on the stability of the source signal, the generation of which is not a straightforward task.

The requirement to transmit power at a level of several kilowatts through the umbilical 16 necessitates the use of a relatively high voltage, low current supply in order to minimise transmission losses. However, such an a.c. power source has significantly different characteristics from those desired for the outgoing waveform.

It is the purpose of the cycloconverter unit 30 is to transform the input a.c. power supply (high voltage, low current, fixed frequency sinusoid) into the desired transmitter waveform (low voltage, high current, variable and controllable frequency and waveform).

One way of generating an output signal of the desired frequency from the input signal is through a half-wave rectifying bridge circuit that is controllably switchable at the zero crossings of the input signal.

FIG. 3 is a graph which schematically represents an ideal output signal from such a bridge, which has reduced the frequency of the output signal by a factor of 5 by switching the bridge at every fifth zero crossing of the signal at the input frequency.

FIG. 4 of the accompanying drawings schematically shows an ideal 256 Hz input voltage as a function of time. The switching takes place on zero crossings of the input waveform (marked with bold vertical lines in the figure). The control operates by detecting these zero crossings, and immediately switching the bridge to provide the appropriate polarity of output for the next half cycle. The frequency and phase of the transmitter output signal depends on the timing at which the polarity of the output half cycles is changed. This can be controlled in two ways.

One approach would be to rely on using a frequency stabilised power supply from the surface vessel to the transmitter's cycloconverter unit. Control over both the frequency and phase of the output signal can in principal be achieved by controlling the phase and frequency stability of the power supply. However, such an approach faces technical problems caused by the capacitive and inductive effects in the tow cable, the cycloconverter itself, and the dipole transmitting antenna, as now being explained.

The tow cable may be constructed using either co-axial or spiral wound electrical conductors. In either case, and especially in the case of a co-axial construction tow cable, several kilometres of cable constitute a very significant capacitance between the power source and the deep tow vehicle. Typically the cable also has some inductance; but the transmission characteristics will vary from cable to cable, and to a lesser extent will also depend on the relative amounts of the cable that are immersed in sea water or wound onto the drum of the towing winch.

The transmitting dipole antenna must be designed to have as low a resistance as possible, in order to optimise the transmitter dipole moment for a given power level. It will however have a significant self-inductance, which will to some extent depend on the characteristics of the seawater through which it is being towed and its proximity to, and the properties of, the seafloor.

There are two major effects of the capacitive and inductive properties of these components of the transmitter system. First, in general the current at any point is not in phase with the voltage. Second, even if the power supply at the surface vessel is designed for low harmonic distortion, the input voltage and current waveforms at the deep-tow vessel are significantly affected by higher harmonics of the supply frequency and by standing waves set up in the system between the ship board power supply and the transmitting electrodes in the antenna. The exact properties of these harmonics and standing waves are difficult to predict, and are likely to vary significantly between installations on different vessels, and even within a single deployment of the transmitter system as tow cable is paid out and hauled in.

FIG. 5 of the accompanying drawings schematically shows how the ideal 256 Hz input voltage indicated in FIG. 4 might more realistically appear due to the effects described above. In response to the input waveform indicated in the figure, the cycloconverter control is liable to detect spurious and unpredictable zero crossings which are due to harmonics or standing waves, and not to the fundamental supply waveform. This is apparent from the number of crossings, again marked with bold vertical lines in the figure. If the zero crossings are used to control the switching of individual half sinusoids, and to control the timing of output waveform polarity reversals, then the source becomes subject to unpredictable frequency jitter and phase drift.

SUMMARY OF THE INVENTION

According to a first aspect of the invention there is provided a cycloconverter for subsea electromagnetic exploration, comprising:

a transformer having a primary side for receiving a high voltage low current signal of a first frequency and a secondary side for outputting a low voltage high current signal also of the first frequency;

a switching circuit connected to receive the low voltage high current signal from the secondary side of the transformer and to switch its polarity so as to generate an output signal having a significant component at a second frequency lower than the first frequency; and a controller configured to control the switching circuit responsive to a measurement of the first frequency.

The cycloconverter preferably further comprises a zero-crossing detector for measuring zero crossings at the first frequency and supplying a zero-crossing signal to the controller, the controller being configured to supply a switching signal to the switching circuit when a zero-crossing signal is received during a time window that has been determined by the controller responsive to the measurement of the first frequency.

A further aspect of the invention relates to a submersible vehicle fitted with a cycloconverter according to the first aspect of the invention.

Another aspect of the invention relates to a method of controlling switching events in a cycloconverter during subsea electromagnetic exploration, comprising:

supplying a high power signal to the cycloconverter at a first frequency;

obtaining a switching signal by measuring the high power signal;

locking into the first frequency, predicting a time window for a next desired switching event; and gating the switching signal with the time window to suppress switching outside the time window.

Accordingly the cycloconverter can prevent the switching being initiated by spurious zero crossings, while retaining the advantages of controlling the outgoing waveform by locking it to the phase and frequency of the ship-board power supply. The ship-board power supply can be controlled by a high quality and readily monitored frequency standard on the towing vessel.

In an embodiment of the invention a secondary tining circuit is provided within the cycloconverter, which screens the observed zero crossings and selects only those corresponding to zero crossings of the fundamental frequency for output waveform generation. Since the frequency of the fundamental component of the power supply is both known and stable, the interval between zero crossings of this component is predictable. The screening process involves passing the output from the zero crossing detector—which consists of a series of pulses, some of which are crossings of the fundamental frequency and some of which are due to higher harmonics and standing waves—through a gating system. Zero crossings which occur significantly earlier than the time of the next predicted crossing of the fundamental frequency are rejected. A zero crossing will not be accepted until a time approaching a half period of the fundamental has elapsed. Once an acceptable zero crossing has occurred, the cycloconverter switches on the semiconductor in the output bridge appropriate to the next output half-sinusoid polarity, and advances a counter which keeps track of the overall output waveform.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
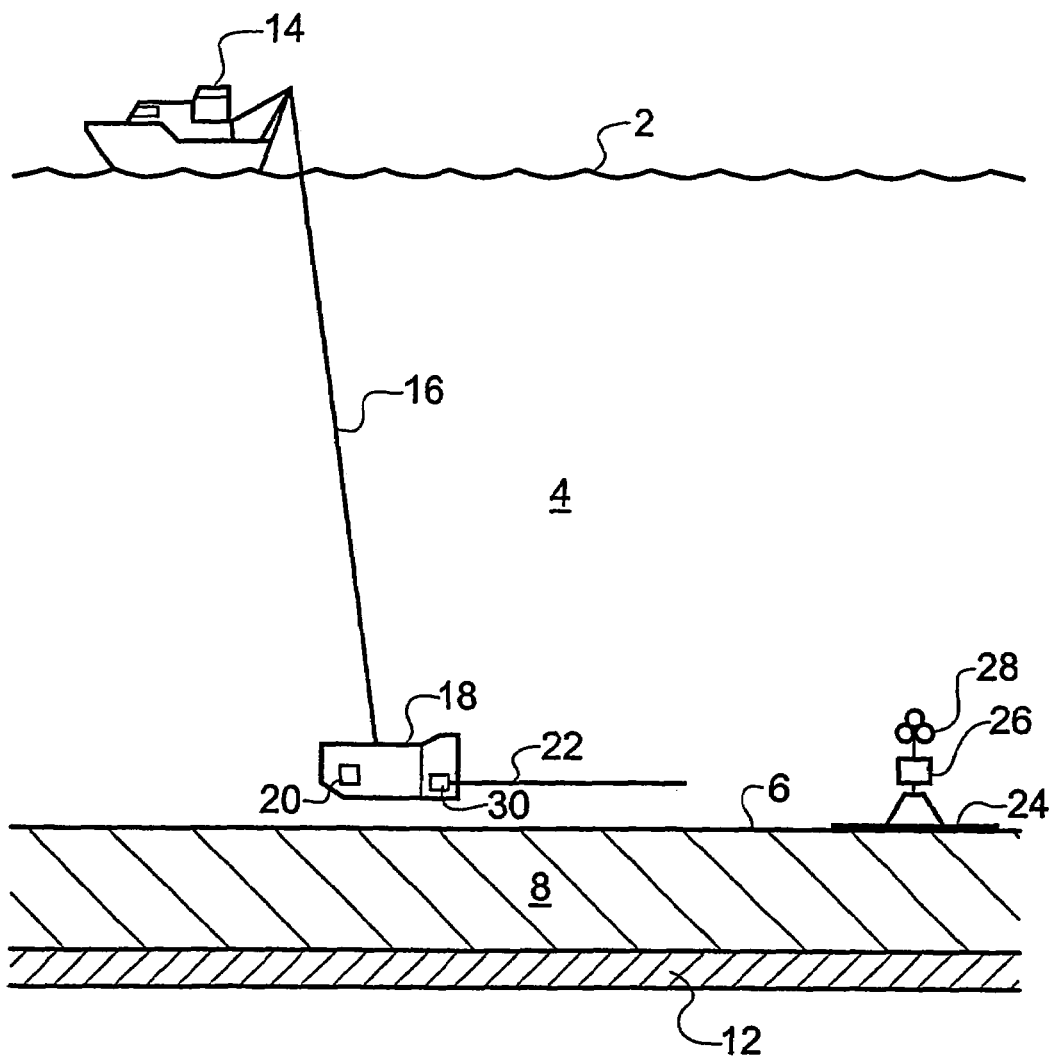
FIG. 1 is a schematic plan view representation of an exploratory EM sounding survey.
Figure 2:
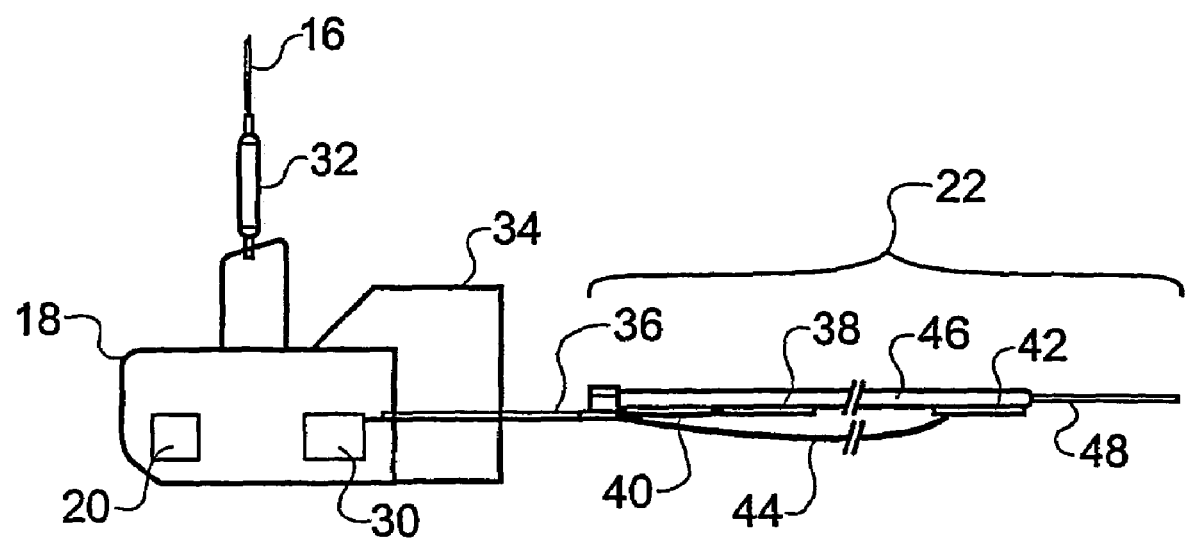
FIG. 2 is a schematic plan view further detailing the submersible deep-sea vessel shown in FIG. 1.

An embodiment of the invention is now described. The embodiment conforms to the general description associated with FIGS. 1 and 2. The foregoing description of those figures is not repeated for the sake of brevity. The following description confines itself to a description of the design of the cycloconverter unit.

Figure 6:
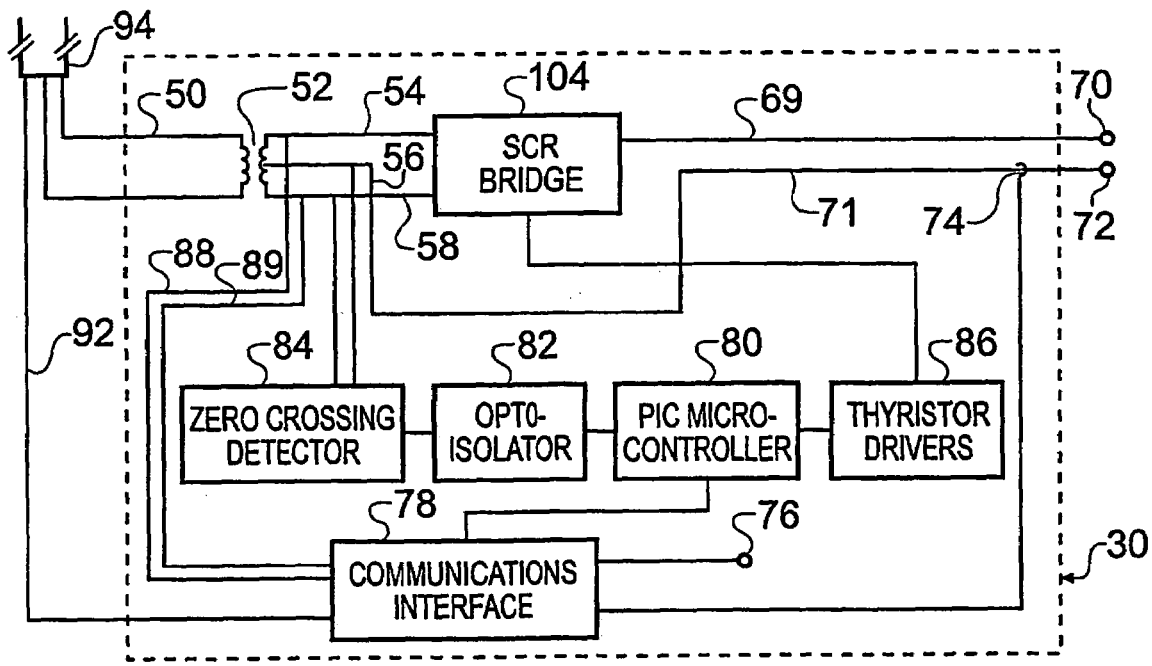
FIG. 6 is a schematic block diagram of a cycloconverter unit according to an embodiment of the invention for generating EM signals.

FIG. 6 is a schematic block diagram of the cycloconverter unit 30 according to an embodiment of the invention. Power and communication cables 50, 92 are carried to the cycloconverter unit 30 via the umbilical connection 94 which connects to the surface vessel 14. The cycloconverter is housed in a pressure container (not shown) in the deep-towed vehicle 18. The waveform generated by the power supply in the surface vessel is in this example sinusoidal with a stabilised frequency of 256 Hz, an amplitude of 2550 V. The signal may be up to 5 Amperes with the example power supply. A 43:1 step down transformer 98 has a plurality of tappings on its secondary windings to provide a first sinusoidal waveform and a second sinusoidal waveform on taps 54 and 58. These waveforms are supplied to the switchable semiconductor relay bridge 104 and combined to provide the required waveform to supply to, in this case, the aft electrode connection 70 via a transmission line 69. The return current from the fore electrode connection 72 is to the transformer 98 secondary winding centre-tap 56 through a transmission line 71. A zero crossing detector 84 samples the voltage on one of the inputs to the semiconductor relay bridge 104 and provides a signal noting the occurrence of each zero crossing to a micro-controller 80 via an optical isolator 82. The micro-controller 80 provides instructions to the thyristor drivers 86 which switch semiconductor relays within the bridge circuit, which is described in more detail below.

In addition several house-keeping parameters are measured and communicated to the surface vessel 14 through a communications interface 78; the current supplied to the antenna is sampled a by current sensor 74; the temperature of the apparatus is sampled by one or more temperature monitors 76; and the voltages of the input waveforms to the bridge are sampled by voltage sensors 88, 89.

Figure 7:
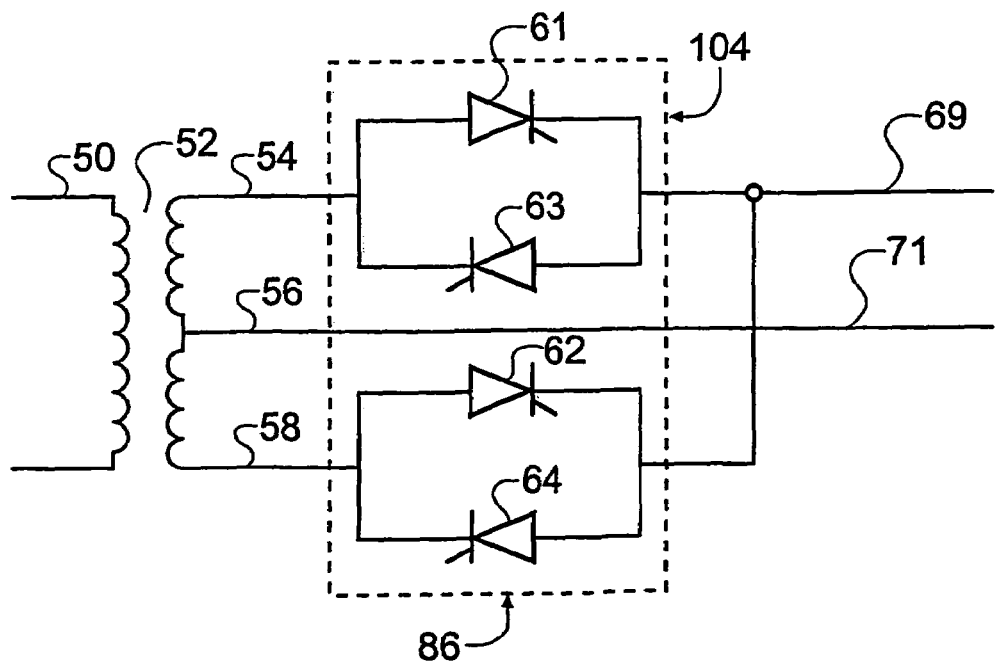
FIG. 7 is a schematic circuit diagram of a part of the cycloconverter unit.

FIG. 7 is a schematic circuit diagram of the cycloconverter unit 30. Input power from the surface vessel 14 is supplied via the umbilical 16 to the primary side 50 of the step-down transformer 52. A centre-tap 56 on the secondary windings on the transformer 50 is provided, which may be considered to represent a floating ground reference voltage. A first tap 54 and a second tap 58 from the transformer 50 secondary windings are also provided. Each of the taps 54, 58 is presented to one arm of a switchable semiconductor bridge 104 comprising four semiconductor relays 61, 62, 63, 64 arranged to form two arms as indicated in the figure. The switching of these relays 61, 62, 63, 64 is governed by the controller 80. The outputs of each arm of the switchable semiconductor bridge 104 are commonly connected to one side 69 of the signal load. The return side of the signal load is connected directly to the centre tap 56 of the transformer's secondary windings through the connection line 71. The signal load is the resistance presented by the seawater between the fore and aft electrodes.

Figure 3:
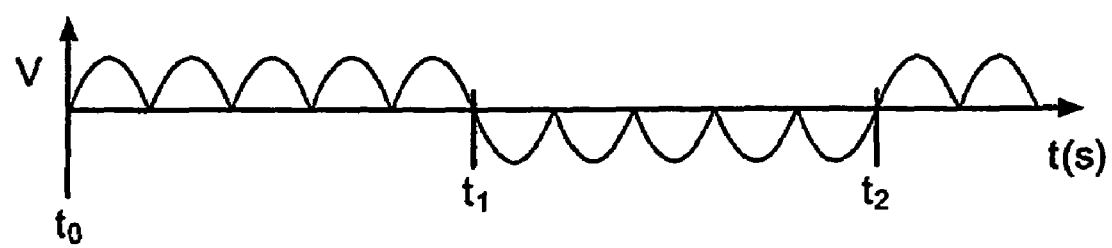
FIG. 3 is a graph showing an output signal waveform for supplying to an antenna of the vessel.

The generation of the output waveform from the input waveforms is achieved by controlled the switching of the semiconductor relays 61, 62, 63, 64 within the switchable semiconductor bridge 104 by the controller 80. Between the times $t_0$ and $t_1$ (see FIG. 3), semiconductor relay 63 and semiconductor relay 64 are held open-circuit whilst semiconductor relay 61 and semiconductor relay 62 are closed and behave as diodes. In this arrangement, the two arms of the switchable semiconductor bridge 104 alternately provide the positive going half cycles of their input waveforms to the switchable semiconductor bridge 104, with a common return path through the load and centre-tap 56. Between the times $t_1$ and $t_2$ indicated in FIG. 3, semiconductor relay 61 and semiconductor relay 62 are held open-circuit whilst semiconductor relay 63 and semiconductor relay 64 are closed and behave as diodes. In this arrangement, the two arms of the switchable semiconductor bridge 104 alternately provide the negative going half cycles of their sinusoidal input waveforms to the switchable semiconductor bridge 104, with a common return path through the load and centre-tap 56. Thus with appropriate switching, the output signal can consist of any desired sequence of half-sinusoids of the supply frequency, and of either polarity. In typical applications, a pseudo-square wave is generated by switching equal numbers of positive and negative half-cycles in sequence, as indicated in FIG. 3.

The digital micro-controller 80 discriminates between allowable and non-allowable pulses from the zero-crossing detector 84, and hence controls reliably the polarity of each output half-sinusoid of the power supply fundamental frequency to generate the desired wave form.

The micro-controller 80 uses a timing algorithm to discriminate between zero-crossing pulses. The time between one acceptable zero-crossing pulse and the gating algorithm allowing the next zero-crossing to be accepted is slightly shorter than the predicted half-period of the fundamental, by an amount which has been tuned to provide optimal performance. Even though on start-up the cycloconverter may accept a spurious zero crossing in the first instance, it will within a few cycles lock in to the zero crossings corresponding to the fundamental frequency of the supplied power. As an example, the times during which a zero crossing can be accepted and acted upon according to the constraints which might be imposed by the micro-controller 80

Figure 4:
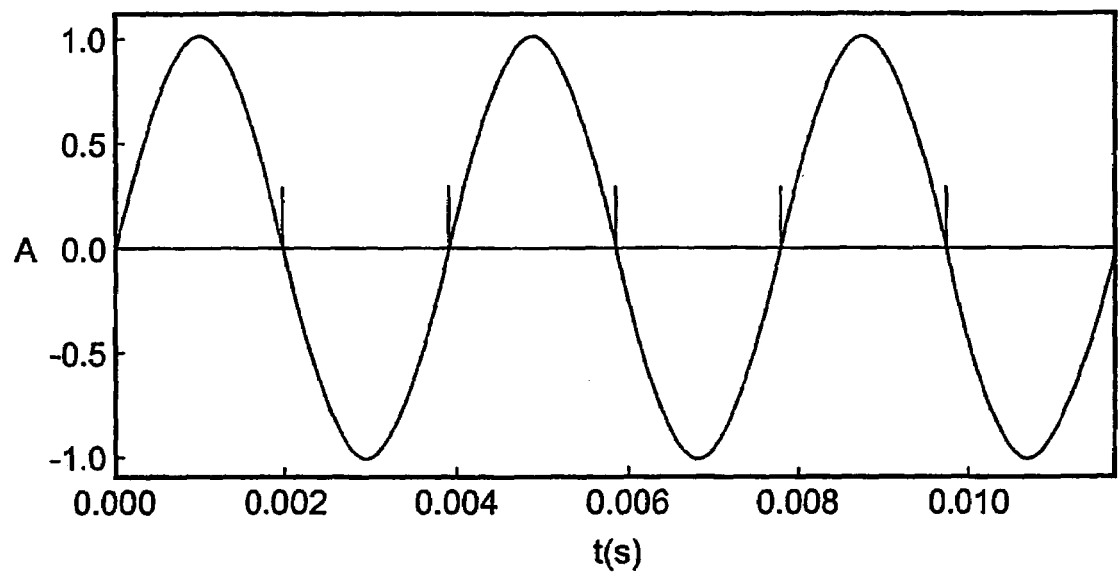
FIG. 4 is a schematic graph showing an idealised waveform with its zero crossings indicated with vertical bold lines.
Figure 5:
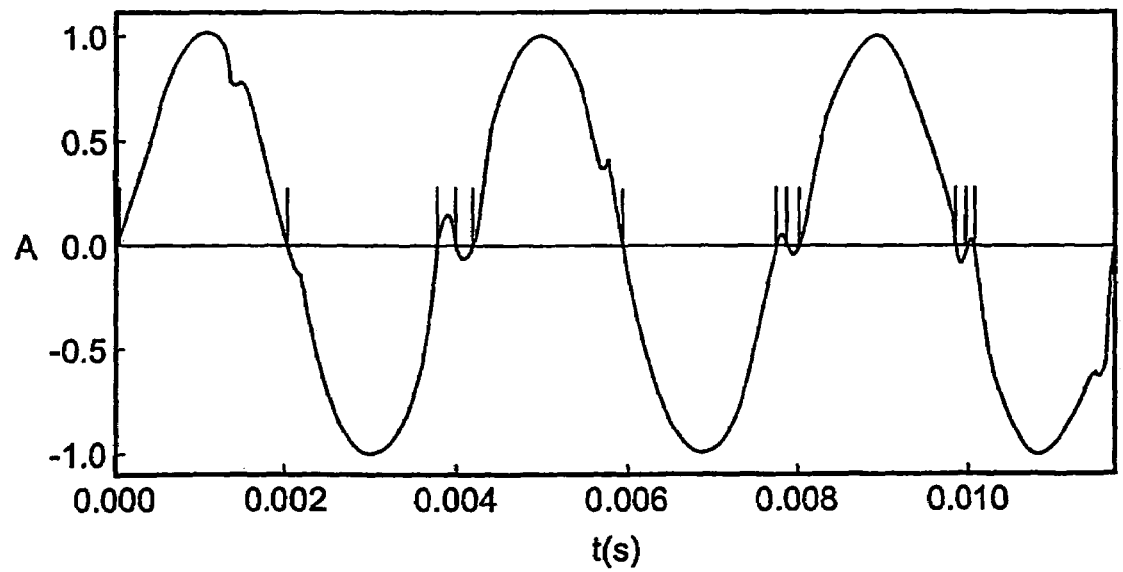
FIG. 5 is a schematic graph showing the form of an actual waveform with its zero crossings indicated with vertical bold lines.
Figure 8:
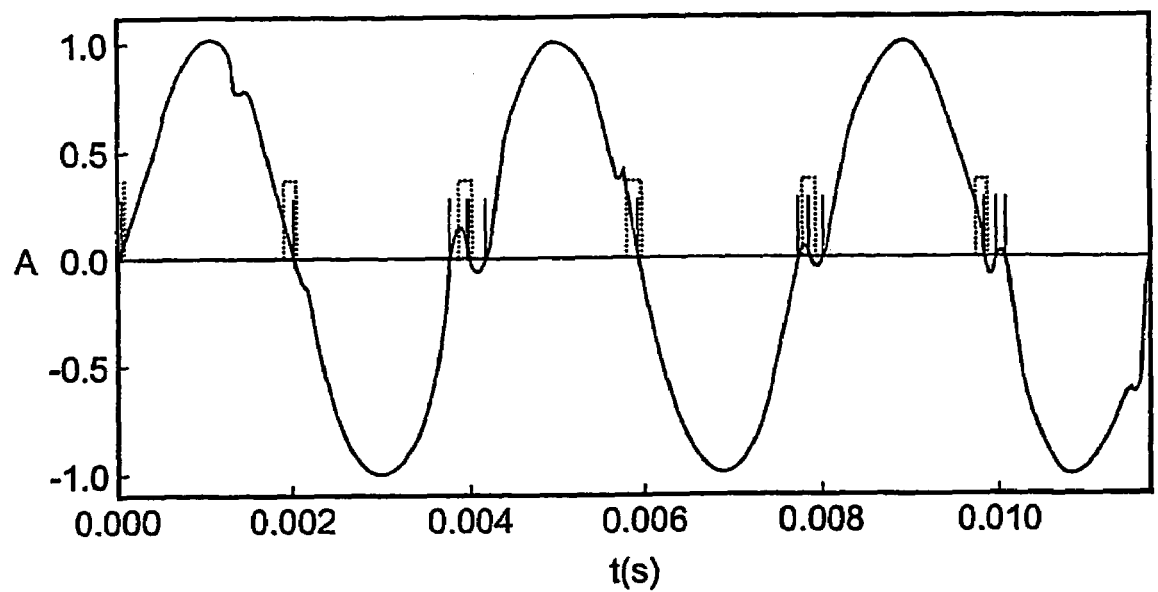
FIG. 8 is a schematic graph showing the normalised form of a voltage signal as a function of time with gating periods marked in dashed lines and zero crossings with vertical bold lines.

FIG. 8 is a reproduction of FIG. 4 with the gating periods superimposed with dashed lines. The gating action provided by the micro-controller 80 thus ensures that out-of-time zero-crossing signals are ignored. Only those zero crossings which occur within the gating intervals will be accepted.

Two important benefits accrue from this arrangement. Firstly, since within a few cycles of start-up the output wave form locks in to the fundamental power supply frequency and phase, unwanted frequency jitter and phase drift in the transmitted geophysical signal are eliminated. The result is a transmitted geophysical signal consisting of discrete spectral lines of predictable frequency, bandwidth and peak amplitude, rather than a set of spectral frequency bands with poorly known characteristics. Secondly, since the timing system which controls the output signal at the deep tow is effectively slaved to the fundamental power supply frequency, the advantages of controlling the output frequency and phase drift from a frequency standard on the towing vessel are obtained. This allows the use either of a self contained, high quality frequency standard such as an oven-controlled crystal, or of a broadcast frequency standard such as a GPS signal, as the controlling standard for the stability of the transmitted geophysical signal.

The invention claimed is:

1. A cycloconverter for subsea electromagnetic exploration, comprising:
    a transformer having a primary side for receiving a high voltage low current signal of a first frequency and a secondary side for outputting a low voltage high current signal also of the first frequency;
    a switching circuit connected to receive the low voltage high current signal from the secondary side of the transformer and to switch its polarity so as to generate an output signal having a significant component at a second frequency lower than the first frequency;
    a controller configured to control the switching circuit responsive to a measurement of the first frequency; and
    a zero-crossing detector for measuring zero crossings at the first frequency and supplying a zero-crossing signal to the controller, the controller being configured to supply a switching signal to the switching circuit when a zero-crossing signal is received during a time window that has been determined by the controller responsive to the measurement of the first frequency.

2. A submersible vehicle fitted with a cycloconverter according to claim 1.

3. The cycloconverter of claim 1, wherein the second frequency is other than a zero frequency.

4. A method of controlling switching events in a cycloconverter during subsea electromagnetic exploration, comprising:
    providing a high voltage low current signal of a first frequency;
    transforming the high voltage low current signal of a first frequency to a low voltage high current signal also of the first frequency;
    measuring the first frequency;
    switching the polarity of the low voltage high current signal based on the measurement of the first frequency to generate an output signal having a significant component at a second frequency lower than the first frequency;
    detecting zero crossings at the first frequency and generating corresponding zero-crossing signals;
    determining a time window based on the measurement of the first frequency; and
    supplying a switching signal for switching the polarity of the low voltage high current signal based on a comparison of the zero-crossing signals with the time window.

5. The method of claim 4, wherein the second frequency is other than a zero frequency.

* * * * *